United States Patent [19]
Astle

[11] 4,364,290
[45] Dec. 21, 1982

[54] ADJUSTABLE TOOL HOLDER

[76] Inventor: William H. Astle, 2380 LaLoma Dr., Rancho Cordova, Calif. 95670

[21] Appl. No.: 213,685

[22] Filed: Dec. 5, 1980

[51] Int. Cl.³ .......................... B23B 27/00; B23B 5/16
[52] U.S. Cl. .................................... 82/36 R; 82/4 C; 407/36; 407/93; 407/106
[58] Field of Search ...................... 82/4 C, 4 R, 36 R; 408/146, 1 B, 80, 82, 104, 203.5, 211, 228; 407/93, 106, 36, 44, 38, 39, 86

[56] References Cited

U.S. PATENT DOCUMENTS

| | | | |
|---|---|---|---|
| 794,989 | 7/1905 | Kohler | 82/4 R |
| 1,204,994 | 11/1916 | Kendall | 408/146 |
| 1,466,409 | 8/1923 | Morrison | 408/146 |
| 3,051,059 | 8/1962 | Davey | 408/82 |
| 3,378,901 | 4/1968 | Dupuis | 407/93 |
| 3,466,955 | 9/1969 | Stier | 82/36 |
| 3,735,461 | 5/1973 | Andrews, Sr. | 29/98 |
| 3,774,484 | 11/1973 | Douglas | 82/36 R |
| 3,802,043 | 4/1974 | Garih | 407/93 |
| 3,847,555 | 11/1974 | Pegler et al. | 29/105 R |
| 3,899,813 | 8/1975 | Lovendahl | 29/105 R |
| 3,992,123 | 11/1976 | Uyetake et al. | 408/104 |

*Primary Examiner*—Leonidas Vlachos
*Attorney, Agent, or Firm*—Bacon & Thomas

[57] ABSTRACT

A tool holder for multiple cutting tools is provided with a cam device to permit precise adjustment of the location of at least one of the tools (for example, an end squaring tool) relative to another tool (a bevel tool). The tool holder is particularly adapted for use with a portable lathe having a mandrel extending through the holder.

4 Claims, 5 Drawing Figures

ADJUSTABLE TOOL HOLDER

BACKGROUND OF THE INVENTION

1. Field of the Invention

This invention relates to turning and cutting tools, and more specifically to a cutting tool holder of the type used with a portable lathe.

2. Description of the Prior Art

Tool holders for machine tools such as portable lathes used to machine or cut the ends of tubular workpieces such as pipes in preparation for welding or for other reasons are well-known, including tool holders that locate and lock various different cutting tools at a precise location for generating different machined surfaces on the end of workpieces. However, the prior art is believed to fail to teach how the cutting position of a single cutting tool among a group of tools supported by the tool holder can be adjusted precisely and positively relative to another or other tool or tools by means of a continuously adjustable cam that provides a rigid support for the end of the tool attached to the holder. The prior art particularly is believed not to teach how a bevel cutter tool for the end surface of a tubular workpiece can be used with an adjustable end squaring tool mounted on the same holder whereby a single end squaring tool can be used to cut the end face of workpieces having varied diameters and wall thicknesses.

SUMMARY OF THE INVENTION

This invention contemplates a rotatable tool holder having a cam device for precisely and incrementally adjusting the location of a cutting tool mounted on the tool holder, and in particular, the position of a specific cutting tool used with another cutting tool used to generate a different machined surface on a workpiece.

More specifically, a tool holder adapted to support at least a bevel cutting tool and an end squaring tool used to machine the end of a tubular workpiece is provided with a cam to enable the end squaring tool to be positively adjusted in an axial sense to accommodate various size workpieces so that an accurate end surface can be generated in combination with a specific bevel surface. The tool holder is particularly adapted for use with a portable lathe wherein an axially projecting mandrel extending through a rotating tool holder supports the latter adjacent the end of a fixed tubular workpiece to be machined by beveling and end squaring.

BRIEF DESCRIPTION OF THE DRAWINGS

With reference to the attached drawings.

DETAILED DESCRIPTION OF A PREFERRED EMBODIMENT OF THE INVENTION

Figure 1:
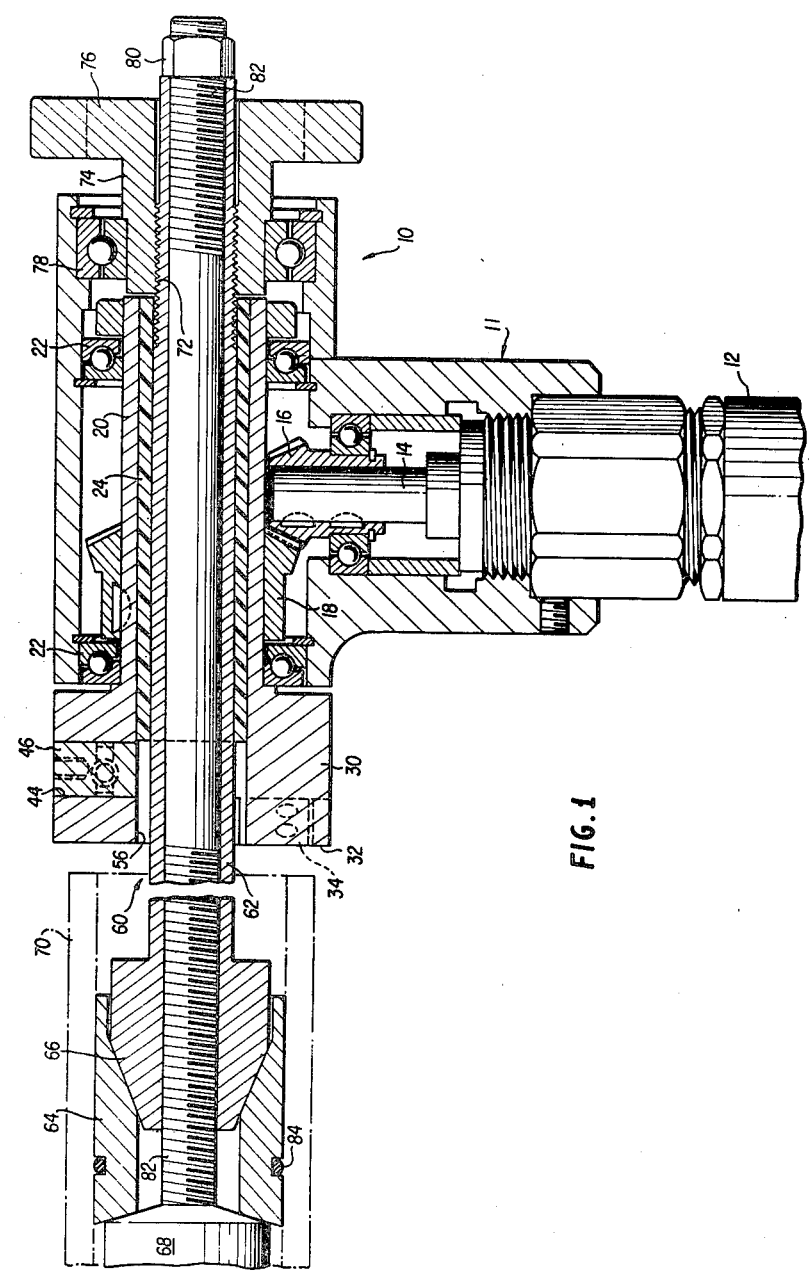
FIG. 1 is a side elevational sectional view of a portable lathe incorporating the adjustable tool holder of this invention, without the cutting tools in place, the section of the tool holder being taken along line I—I of FIG. 2.

Referring to the drawings, FIG. 1 shows a preferred embodiment of a portable lathe tool 10 that generally is made up of a housing 11, driving motor 12, a motor drive shaft 14, a pinion drive gear 16, a ring gear 18, a drive shaft 20 supported by bearings 22 and containing a non-metal bearing sleeve 24.

Motor 12 normally drives shaft 20 in rotation about a longitudinal axis of rotation extending along the shaft 20 by means of gears 16, 18.

Figure 2:
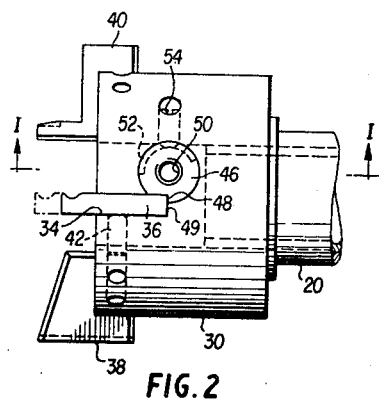
FIG. 2 is a plan view of the tool holder with the cutting tools in place.
Figure 3:
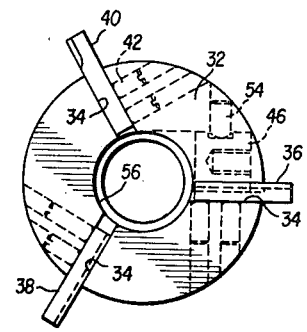
FIG. 3 is an end view of the tool holder of FIG. 2.
Figure 4:
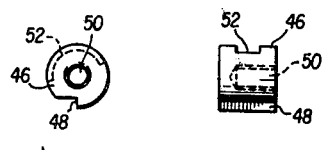
FIG. 4 is a composite plan and end view of the cam element of this invention.

On the end of the drive shaft 20 shown at the left in FIG. 1 is a cutting tool holder and support 30, illustrated without the cutting tools in place. Reference should also be made to FIGS. 2 and 3 for the configuration of the tool holder with the cutting tools in place. The section of the tool holder 30 in FIG. 1 has been taken along line I—I in FIG. 2 to more clearly show certain details of the holder.

The tool holder 30 includes a radial face portion 32 having three circumferentially spaced radially and axially extending tool locating and receiving slots 34 opening on the face portion and projecting rearwardly therefrom a sufficient depth to contain the supported ends of the cutting tools 36, 38, 40. The tools 36, 38 and 40 respectively are a workpiece end squaring tool, a bevel tool and a boring tool, for example. The tools are locked in place in the locating slots 34 by means of chordwise threaded set screws 42.

The tool holder and support 30 is also provided with a radial aperture 44 within which in close fitting relationship is a cylindrical cam element 46 that is rotatable in the aperture about its cylindrical axis. The cam 46 has a camming surface 48 that projects into the slot 34 containing tool 36 and effectively forms a radially extending end wall of the slot behind the radial rear end face 49 of the cutting tool 36. Movement of cam 46 about its axis of rotation effectively changes the location of the rear end wall of slot 34 containing tool 36 and, when tool 36 is in place, changes the location of the tool 36 in an axial sense, as shown by the dotted line position of tool 36 in FIG. 2.

Cam 46 is also provided with a threaded aperture 50 for receiving a cam actuating tool (not shown) that is used to rotate cam 46. An undercut groove 52 on cam 46 cooperates with a cam retaining set screw 54 that retains cam 46 in aperture 34 while permitting rotation of cam 46 within the aperture.

The tool holder 30 has an axial annular opening 56 through which projects a cylindrical workpiece engaging mandrel generally indicated at 60 in FIG. 1. The mandrel includes a longitudinal support shaft 62 which is provided, for example, with a set of jaws 64 that are actuated in a conventional manner by mandrel cam surfaces 66, 68 to engage the internal diameter of a hollow cylindrical workpiece 70 to be machined by cutting tools 36, 38, 40.

The mandrel support shaft 62 is hollow and extends axially to the other end of the lathe 10 in close engagement with the sleeve 24. A threaded portion 72 of the support shaft 62 cooperates with an internally threaded rotatable feed nut 74 having a hand knob 76 thereon supported by a bearing 78. Rotation of the knob 76 moves the mandrel and workpiece axially towards or away from the tool holder 30 while the mandrel 60 accurately supports and locates the workpiece relative to the lathe, and particularly the tool holder 30. Normally the workpiece 70 is clamped against rotation by a separate means or is otherwise fixed against movement, so the mandrel 60 supports the lathe 10 with respect to the fixed workpiece.

The jaws 64 of mandrel 60 are actuated to locking position by a locking nut 80 that is rotatable and is threaded to locking shaft 82 that extends coaxially through mandrel support shaft 62. Rotation of nut 80 moves the cams 66, 68 towards or away from each other to actuate the jaws 64, around which is wrapped a return spring 84.

Figure 5:
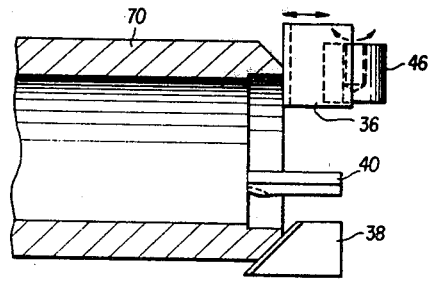
FIG. 5 is a schematic representation of the cutting tools in operation.

The operation of the invention can be best understood with reference to FIGS. 1 and 5. Actuation of the motor 12 turns the tool holder 30 in rotation to perform a cutting operation on the end face of a cylindrical workpiece 70, for example in preparation for welding the workpiece 70 to another similar workpiece. The workpiece, moreover, may be an iron pipe or the like. The tool 38 is a bevel cutter that bevels the end of workpiece 70 and the end squaring tool 36 precisely cuts a square end face on the proximal end of the bevel cut. The boring tool 40 precisely cleans and cuts an inner diameter dimension within the beveled area of the workpiece 70. The cam 46 permits the axial location of the end squaring tool 36 to be precisely adjusted while it is fully supported from behind by the camming surface of the cam 46. The set screws 42 locking the tool 36 in place are, of course, loosened to permit precise adjustment of the tool location, then are retightened to hold the tool against the side of the slot 34. The cam thus permits a single tool 36 to be used with a range of bevel tools 38 for cutting a range of workpiece diameters and wall thicknesses.

Various mechanical modifications within the aptitude of a skilled technician can be made to alter the configuration of the preferred embodiment without departing from the spirit and scope of the invention herein disclosed and claimed. For example, the specific disclosed configuration of the tool holder driving and support system is exemplary and can be modified in various ways to achieve the same result, namely rotation of the tool holder and locating the tool holder with respect to a workpiece while the latter are drawn together to accomplish a cutting or turning operation. Moreover, the specific cutting tools are exemplary, although it is believed that a specific advantage is obtained when the invention is used with a bevel cutting tool and an end squaring tool because of the geometries of the respective cuts that are made that requires a variable location of the cutting plane of the end squaring cut when different size workpieces are involved. In addition, the specific cam configuration is exemplary, because the shape of any particular cam will always be dictated by the particular tool and tool locating means used in any particular embodiment of the invention. For example, the cam could be oriented differently and be provided with a continuous curved cam surface that is contiguous with a cutting tool surface to vary the location of a position of the tool in a variety of directions, although it is believed that the disclosed orientation and configuration of the cam has a particularly good advantage for performing cutting operations of the type represented in FIG. 5. Thus, while such variations to the disclosed embodiment can be made, the invention is not limited to such an embodiment, but rather is to be considered as having a scope as defined in the following claims.

I claim:

1. In a rotary cutting tool holder including a tool support rotatable about an axis and having axially separated proximal and distal ends, at least one axial opening for receiving a cutting tool bit that extends from the distal end of the support when received in said opening, a releasable lock for securing a tool bit to the holder in the opening, and a rotatable cam element mounted on the tool support for adjustably axially positioning the tool on the tool support with the cam rotational axis oriented generally radially of the tool support, the improvement comprising, said cam having only a single peripheral edge feature extending laterally into the axial opening adjacent its proximal end to form an abutment that is substantially axially movable within the axial opening by rotation of the cam, and means for securing the cam against rotation.

2. In a rotary cutting tool holder as claimed in claim 1, the improvement comprising, said cam being cylindrical and said peripheral edge feature comprising a camming surface engageable with a tool bit, said camming surface defined by an undercut surface extending along one side only of the cam along the length thereof.

3. In a rotary cutting tool holder as claimed in claim 2, the improvement comprising, said camming surface extending substantially over the full depth of the axial opening.

4. In a rotary cutting tool holder as claimed in claim 1, the improvement comprising, multiple axial openings for receiving different cutting tool bits including an end squaring tool bit and a bevel tool bit for respectively squaring and cutting a bevel on the end of an annular workpiece, for example a pipe, said cam element associated only with the opening for receiving said squaring tool bit to permit adjustment of the bevel length by adjustment of the axial position of the squaring tool bit by means of the cam.

* * * * *